(12) United States Patent
Aloush et al.

(10) Patent No.: US 8,750,300 B2
(45) Date of Patent: Jun. 10, 2014

(54) RELAYING OF MULTICAST TRANSMISSIONS

(75) Inventors: Avner Aloush, Natanya (IL); Aharona Lurie, Or-Yehuda (IL); Ronald Bruce Sterenson, Raanana (IL)

(73) Assignee: Sigma Designs Israel S.D.I. Ltd., Tel Aviv (IL)

( * ) Notice: Subject to any disclaimer, the term of this patent is extended or adjusted under 35 U.S.C. 154(b) by 27 days.

(21) Appl. No.: 13/371,527

(22) Filed: Feb. 13, 2012

(65) Prior Publication Data

US 2013/0208719 A1    Aug. 15, 2013

(51) Int. Cl.
H04L 12/28    (2006.01)

(52) U.S. Cl.
USPC .......................... 370/390; 370/218; 455/445

(58) Field of Classification Search
None
See application file for complete search history.

(56) References Cited

U.S. PATENT DOCUMENTS

| | | | |
|---|---|---|---|
| 7,583,796 B2 | 9/2009 | Tomikawa et al. | |
| 2002/0165957 A1 | 11/2002 | Devoe et al. | |
| 2006/0218301 A1 | 9/2006 | O'Toole et al. | |
| 2007/0286097 A1 | 12/2007 | Davies | |
| 2008/0059637 A1 | 3/2008 | Gerstel et al. | |
| 2009/0100176 A1 | 4/2009 | Hicks, III et al. | |
| 2009/0135820 A1* | 5/2009 | Suzuki | 370/390 |
| 2012/0182991 A1* | 7/2012 | Vazquez et al. | 370/390 |

OTHER PUBLICATIONS

Nesin, "QoS Part 3: What's special about HomePNA's Guaranteed Qos." in: Homepna Blog [online], Jun. 20, 2008. Retrieved on Jun. 4, 2011 from the Internet at URL:<http://homepnablog.typead.com/my_weblog/2008/06/index.html>, especially third and fourth paragraphs.

* cited by examiner

Primary Examiner — David Oveissi
(74) Attorney, Agent, or Firm — Eitan, Mehulal & Sadot

(57) ABSTRACT

A method for multicast transmissions between a source node and a client node includes the source node generating a multicast stream identifier to uniquely identify the multicast stream, and the source node establishing a path between the source node and the client node for a specified the multicast stream, each node in the path using unicast routing tables in order to identify a next node on the path during path establishment, and the source node transmitting messages of the specified multicast stream along the path. Network nodes implement the method.

19 Claims, 5 Drawing Sheets

RELAYING OF MULTICAST TRANSMISSIONS

FIELD OF THE INVENTION

The present invention relates to multicast transmissions generally.

BACKGROUND OF THE INVENTION

There are three major types of transmissions on a communications network, unicast, broadcast and multicast. Unicast transmissions are direct transmissions between two nodes of the network, such as when one node is downloading data from another. Broadcast transmissions are transmissions from one node to all the other nodes, such as network control information from the central node to all the other nodes. Multicast transmissions are transmissions from one node to a few of the other nodes, such as when multiple "clients" request to receive regular reports from a "source" (e.g. clients to a news feed).

Reference is now made to FIG. 1 which illustrates an exemplary network of three nodes 1, 2 and 3, connected in series on a wired network. Node 1 is connected to a client device A and node 3 is connected to a client device B. Device A sends and receives transmissions via node 1 and device B sends and receives transmissions via node 3. For example, device A may be the source address (SA) and device B may be the destination address (DA) of a packet sent from device A to device B. For unicast transmissions, the nodes in the network determine, using the unicast routing tables, which are either calculated locally or by a central node such as a domain master (which, in FIG. 1 is node 2), which nodes may be used as relays to reach other nodes. The unicast routing tables are built using the information advertised by each node regarding its list of clients and the network nodes that are in its visibility (i.e. that it has physical links with them). Each node listens to the transmission of the other nodes to determine with which nodes it may potentially have a direct physical link. Using the unicast routing tables, node 1, for example, can determine that a packet sent from its client device A to device B needs to be sent to node 3, which has device B as its client. Furthermore, regardless of whether or not node 3 is visible to node 1, node 1 knows from the unicast routing tables that it has to send all packets designated to node 3 via node 2.

In this example, node 3 is a hidden node to node 1 and node 2 is defined in the unicast routing table as a relay to be used by node 1 to reach node 3.

This method works well for unicast transmissions. However, it does not work for multicast transmissions which want to minimize the number of transmissions needed. In unicast transmissions, each node can read the DA of a client in a sent packet, each node can determine behind which node the client is situated, and each node knows whether it is a relay to that node or not. For example when node 2 receives a packet from node 1 with a DA of device B, it knows from the unicast routing tables that device B is a client of node 3 and that it has to send the packet as a relay to node 3. For multicast packets, the DA is a multicast DA and not an address of a certain client, hence not all the nodes in the network can extract from this DA the list of nodes that need to get the packet. The connection between the multicast DA and the clients to which the packet has to be sent is determined prior to the sending of the message by a special join message request sent out by the clients or by an internal decision made by the source node. When a join message is used, it is sent directly to the node where the source of the multicast traffic resides and not to all nodes of the network. Moreover, since the join request is stored in the payload of the packet, only the nodes that are connected to the clients and to the source can decode the join message, especially when the network uses encryption. Hence, all the other nodes in the network do not understand which nodes need to receive the multicast packet.

SUMMARY OF THE PRESENT INVENTION

There is provided in accordance with a preferred embodiment of the present invention, a network node including at least one unicast routing table to at least store information about which node may be used as a relay node towards each other node in a network, and a multicast path generator to receive an establish path request message to be created towards a client node, and to select a next node in a multicast path towards a client node by checking the unicast routing tables and to transmit the establish path request message to the next node.

Further, in accordance with a preferred embodiment of the present invention, the multicast path generator also comprises a multicast table to store a multicast stream identifier from a source node and a next node in a path.

Additionally, in accordance with a preferred embodiment of the present invention, 3. The network node according to claim 2 and also comprising a multicast transmission unit to transmit multicast transmissions from a source node to the client node according to the multicast table.

Moreover, in accordance with a preferred embodiment of the present invention, the network node is the source node.

Further, in accordance with a preferred embodiment of the present invention, the multicast path is used unless the link to the next node in the path becomes broken.

There is also provided, in accordance with a preferred embodiment of the present invention, a method for multicast transmissions between a source node and a client node, the method including the source node generating a multicast stream identifier to uniquely identify the multicast stream, and the source node establishing a path between the source node and the client node for a specified the multicast stream, each node in the path using unicast routing tables in order to identify a next node on the path during path establishment, and the source node transmitting messages of the specified multicast stream along the path.

Further, in accordance with a preferred embodiment of the present invention, the establishing includes the source node using its the unicast routing tables to transmit a multicast path message towards a relay node in the direction of the client for a particular the multicast stream, and the source node receiving a confirmation message from the client node after the client node received the establish path request message passed by relay nodes between the source node and the client node.

Still further, in accordance with a preferred embodiment of the present invention, the establishing is in response to receiving a join request from the client.

Additionally, in accordance with a preferred embodiment of the present invention, the establishing is subsequent to an internal decision made by the source node to send the multicast transmission to the client node.

Moreover, in accordance with a preferred embodiment of the present invention, the method also includes the nodes not updating the multicast path in response to a change in any of the unicast routing tables.

Further, in accordance with a preferred embodiment of the present invention, only the source node is able to update the multicast path.

Still further, in accordance with a preferred embodiment of the present invention, the method also includes the source node rebuilding the path when a connection between two the nodes in the path breaks.

Additionally, in accordance with a preferred embodiment of the present invention, the method also includes the source node releasing the nodes from the path when a connection between two the nodes in the path breaks.

Moreover, in accordance with a preferred embodiment of the present invention, the method also includes each the relay node rejecting new path request sent not from its previous node in the path associated with the multicast stream.

Further, in accordance with a preferred embodiment of the present invention, the nodes are forced to use a next node according to instructions from the source node that differ from the next node in their unicast routing tables.

Still further, in accordance with a preferred embodiment of the present invention, the method also includes the source node releasing the client node by also releasing the nodes on the multicast stream path.

Additionally, in accordance with a preferred embodiment of the present invention, the node on the multicast stream path sends a release path message to the next node on the path and where each node sends back a release path confirmation.

Moreover, in accordance with a preferred embodiment of the present invention, the method also includes an aging mechanism to determine that the source node has left the network.

Further, in accordance with a preferred embodiment of the present invention, the source node sends periodic path alive messages to the nodes bound to the multicast stream and where each node bound with the multicast stream resets its aging timer upon reception of the path alive message.

Still further, in accordance with a preferred embodiment of the present invention, the nodes release all resources associated with the multicast stream and unbind itself from the multicast stream if the aging timer has expired.

Additionally, in accordance with a preferred embodiment of the present invention, each relay node in the path adds its device identifier to the confirmation message and where the source node stores the nodes comprising the path towards a client node based on the confirmation message.

Moreover, in accordance with a preferred embodiment of the present invention, each node that is released from the multicast stream path releases all resources associated with the multicast stream if it is no longer a relay node in any of the paths of that multicast stream.

In accordance with a preferred embodiment of the present invention, a network source node including at least one unicast routing table to at least store information about which node may be used as a relay node towards each other node in the network, and a multicast path generator to create an establish path request message towards a client node, to select a next node in a multicast path towards the client node in accordance with the unicast routing tables, and to transmit the establish path request message to the next node.

Further, in accordance with a preferred embodiment of the present invention, the multicast path generator also comprises a multicast table to store a multicast stream identifier from the source node and a next node in a path.

Still further, in accordance with a preferred embodiment of the present invention, the network source node also includes a multicast transmission unit to transmit multicast transmissions from the source node to the client node according to the multicast table.

Additionally, in accordance with a preferred embodiment of the present invention, the multicast path is used unless the link to the next node in the path becomes broken.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicants have realized that networks should transmit multicast transmissions as efficiently as possible. To date, the prior art has not determined how to do so and, instead, transmits data which should be multicast data as broadcast or as multiple, unicast transmissions. This is easy to do, but wastes bandwidth resources of transmissions to those nodes which did not subscribe to the publication. Moreover, broadcast transmissions need to be sent at the lowest bit loading so that all nodes may receive them.

Figure 2:
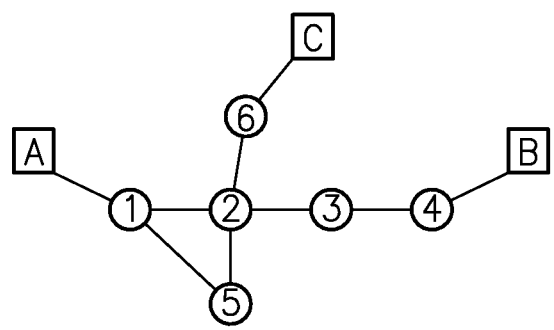
FIG. 2 is a schematic illustration of an exemplary network representing a network with source and client nodes, constructed and operative in accordance with the present invention.

Reference is now made to FIG. 2 which is an exemplary network of six nodes. A client B may send a join request to a multicast stream source A. The join request may be sent via node 4, who may send the join request to node 1 where source A resides.

Multicast stream source A may receive the join request and source's node 1 may snoop on the join request packet. Node 1 is authorized to snoop and has the encryption key for multicast stream source A. Thus, node 1 may determine that client B has requested to become a client to the specified multicast stream source A. It will be appreciated that node 1 could have decided to send a multicast stream towards node 4, based on its internal decision, without an explicit join message sent from client B to source A. Node 1 then generates a multicast stream identifier (MSID) that, together with a device identifier DEVICE_ID of node 1, uniquely identifies the multicast stream from Source A.

Figure 3A:
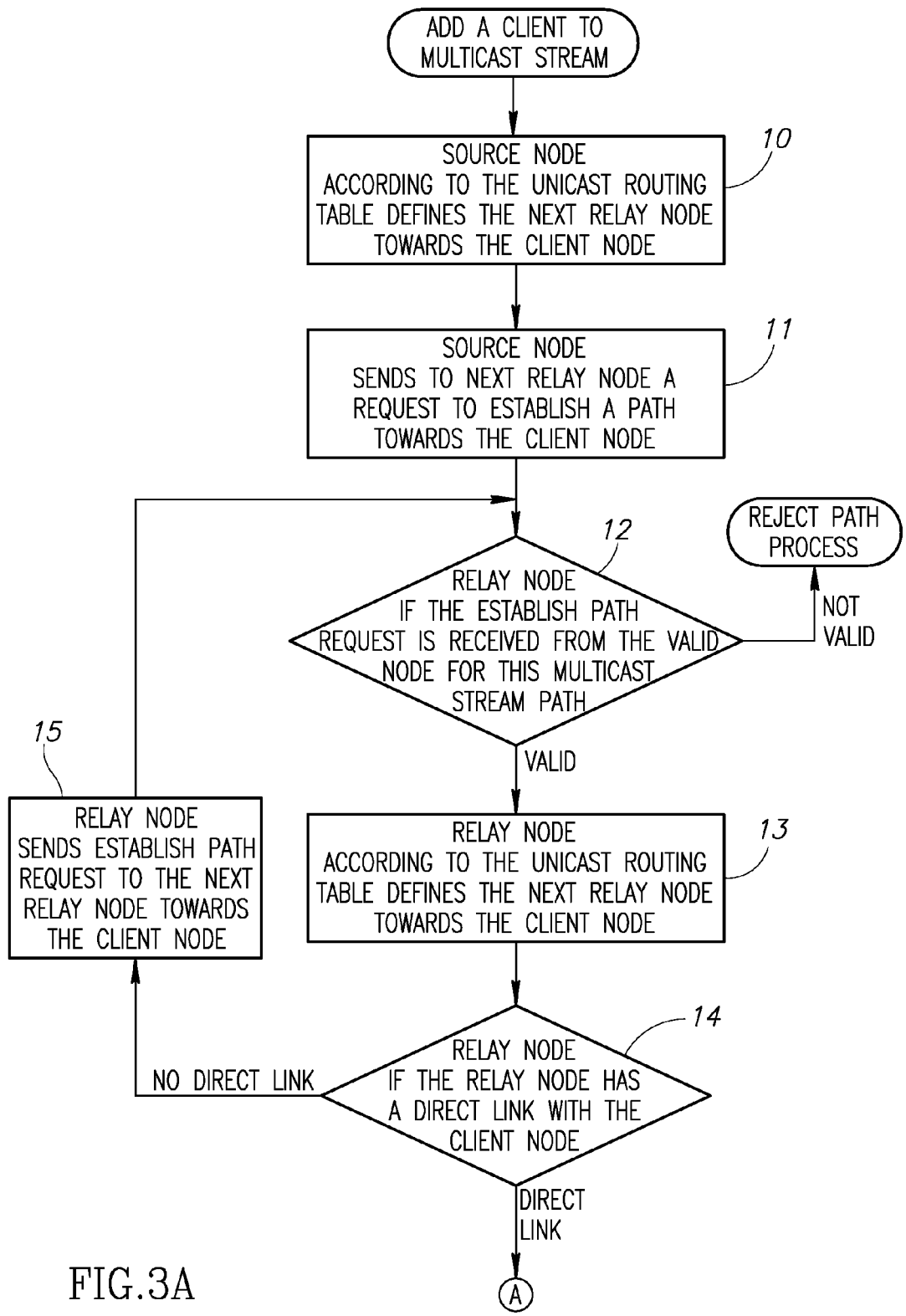
FIGS. 3A and 3B together illustrate a block diagram of a novel method for setting up a path to a client for multicast transmissions, constructed and operative in accordance with the present invention.
Figure 3B:
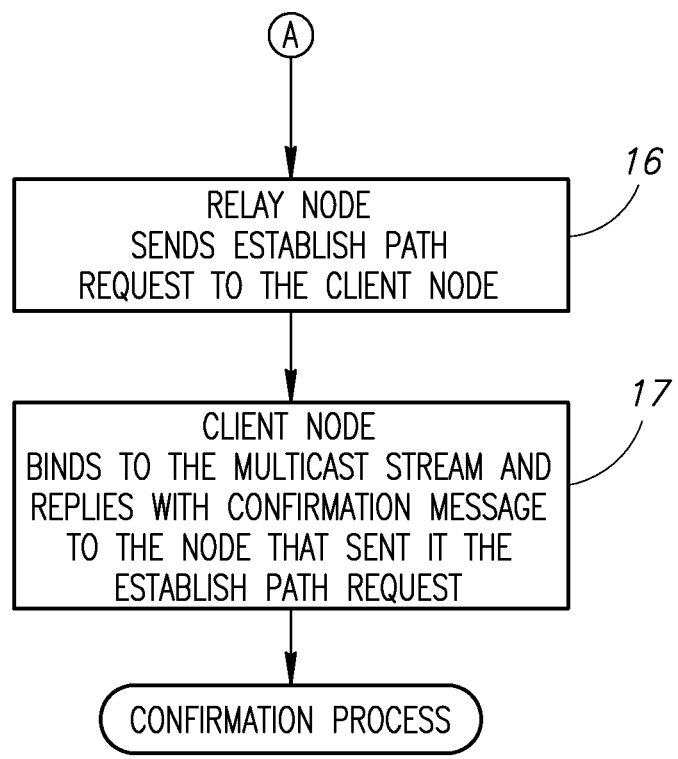

Reference is now made to FIGS. 3A and 3B, which together illustrate a method for setting up a path to a client for multicast transmissions. Applicants have realized that node 1 already has the next node information required for its path towards client B from the unicast routing tables. Thus, in accordance with a preferred embodiment of the present invention, node 1 may utilize (step 10) its unicast routing tables to instruct (step 11) the next node (node 2) in the relay path to the client on how to handle multicast transmissions sent from node 1 and identified by a certain MSID. It will be appreciated that this way, each relay node between node 1 and node 4 may use the unicast routing tables to determine (step 13) the next best relay node to use for this stream. The relay node then sends (step 15) the message to the next relay node, or if the relay node has direct link with the client node (step 14) it sends (step 16) the message to the client node directly. As may be discussed hereinbelow, the relay node may also check (step 12) that the establish path request was received from the valid node for this multicast stream path.

In the simple network of FIG. 2, node 1 is connected to client B via nodes 2, 3 and 4. Node 6, which handles client C, is connected to node 2, as is node 5. When client B joins to multicast stream of source A, node 1 informs node 2 which in turn informs node 3, etc. that they are in the relay path for multicast transmissions to client B. Thus, when node 2 receives transmissions from node 1 on a certain multicast stream identified by a certain MSID, node 2 passes the received transmissions to node 3.

When source node 1 decides to add client C also to the multicast stream of source A, node 1 instructs node 2 to forward each multicast transmission associated with the same MSID to both node 3 and node 6.

It will be appreciated that, since each node in the path only knows the identity of the next node in its path, source node 1 does not know the full path to its clients. Therefore the end node (the client's node) may send a unicast message back to source node 1 with the final path in the confirmation phase of the path establishment process, as is described hereinbelow.

More specifically, if the source node, such as node 1, is directly connected to the client node, such as node 2, the source node, node 1 may directly send a path request message to bind the client node to the specified multicast stream, via the MSID. The client node may reply with a confirmation message and may bind itself to the established path identified by the MSID, the DEVICE_ID of the source node. Upon receiving the confirmation message, the source node may bind itself to the path and complete the path establishment procedure.

However, if the source node does not have a direct link to the client node, as discussed hereinabove, the source node may determine the first relay node towards the client node according to its (i.e. the source node's) current unicast routing tables and may send (step 11) a path request message to the first relay node, such as node 2, to be relayed to the client node.

This path request message may contain the following fields: the DEVICE_ID of the source node of the multicast stream, the allocated MSID, the client node DEVICE_ID and the first relay node DEVICE_ID. Upon receiving the path request message, the addressed relay node, node 2, may check its direct links to see if (step 14) the client node is directly connected to it. If not, the addressed relay node may bind the next relay node, such as node 3, towards the client node, according to its (i.e. node 2's) unicast routing tables, with the bound MSID information. Then it may update the path request message with its DEVICE ID and may send (step 15) the updated path request message to the next relay node. This process may be continued until the next relay node realizes it has a direct link with the client node (step 14).

The next relay node, such as node 3, that receives the path request message and has a direct link with the client node, node 4 (as per step 14), may update the path request message with its DEVICE ID and may transmit (step 16) the path request message to the client node.

Figure 4:
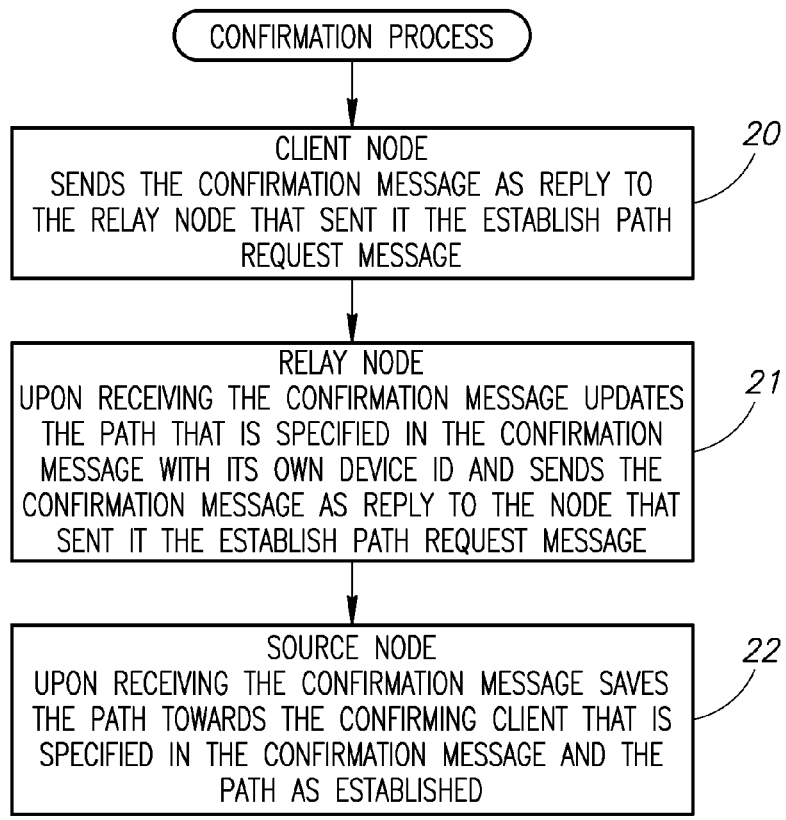
FIG. 4 is a block diagram of a novel method for confirming an establishment of a path for multicast transmissions, constructed and operative in accordance with the present invention.

Reference in now made to FIG. 4 which illustrates the multicast stream confirmation process. Upon receipt of the path request message, the client node, node 4, may reply (step 20) to the last relay node, node 3, with a confirmation message. The last relay node, node 3, may bind the client node (DEVICE_ID) with the multicast stream path identified by the DEVICE ID of the source node and the multicast stream identifier MSID. The relay node may update the confirmation message by adding its DEVICE_ID to the confirmation message. The relay node may then transmit (step 21) an updated confirmation message to the node that originally sent it the path request message, which may be a relay node or the source node of the multicast stream. Thus, the confirmation message when eventually received by the source node, may include in it the entire path to the client node, such as nodes: 1, 2, 3 and 4 for client B.

The source node, node 1, may get the complete path to the client node, node 4, from the confirmation message and may save (step 22) it together with the bound client node to complete the establishment of the path. With this, the source node, node 1, may start sending the multicast stream packets towards the client node, node 4, via the first relay node according to the established path. Each relay node may identify the data units for the multicast stream according to the multicast source node DEVICE_ID and the MSID specified in the data unit header. Each relay node may relay any received data unit to all the nodes bound to the identified MSID from the source node according to the binding information that it has configured during the path establishment.

Importantly, the nodes may remain bound to the path defined by this process. Thus, when any node in the multicast path receives an updated routing table, it may not update any of its current multicast paths. A relay node may correct an established multicast path only by explicit order received from the multicast source node as described hereinbelow.

It will further be appreciated that the present invention may ensure that a node does not receive duplicate multicast packets of the same multicast stream from different paths and it may prevent the source node or any other relay node from duplicating transmissions unnecessarily. The path of any multicast stream may be built under the principal rule that each node may receive packets of a specified MSID of a certain source node from only one other node which is considered as the valid node.

Figure 5:
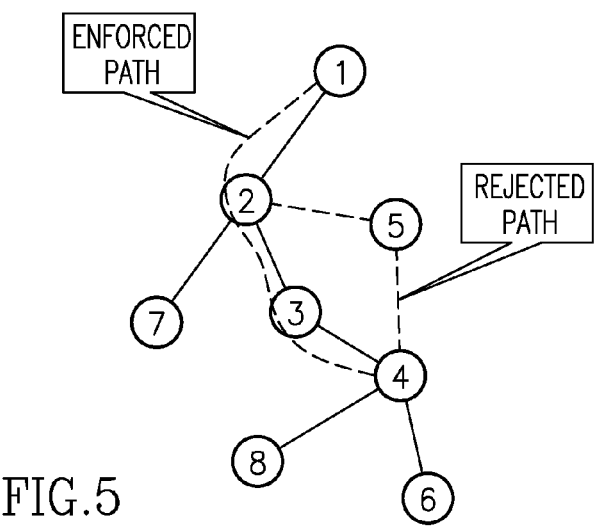
FIG. 5. illustrates an exemplary multicast stream with enforced and rejected paths.

Reference is now made to FIG. 5 that illustrates an exemplary multicast stream that may be sent from node 1 to node 8. The multicast path created by node 1 to transmit multicast transmission to node 8 may contain node 2, node 3 and node 4 as relay nodes. Therefore, when source node 1 binds a new client node, such as node 6, to the existing multicast stream, source node 1 may send the path request message towards client node 6 as defined hereinabove. Any relay node on the path towards the newly joined client node 6, such as node 4, may also verify that it receives the path request for this client node via the same node it is bound to by the already established path as specified in step 12 of the process of FIG. 3A.

It is possible that a relay node may receive a path request message from a node that is not the valid node for a certain multicast stream specified by an MSID of a certain source node. For example, node 4 may receive a path request message to add client node 6 from node 5. This could happen, for example, when the current routing table is changed so that the path from node 2 to node 6 is via relay node 5. When relay node 4 gets the path request message to bind client node 6 from node 5, instead of from node 3 which is its valid node for this specified MSID according to the original path for that multicast stream, node 4 rejects the establish path request.

Figure 6:
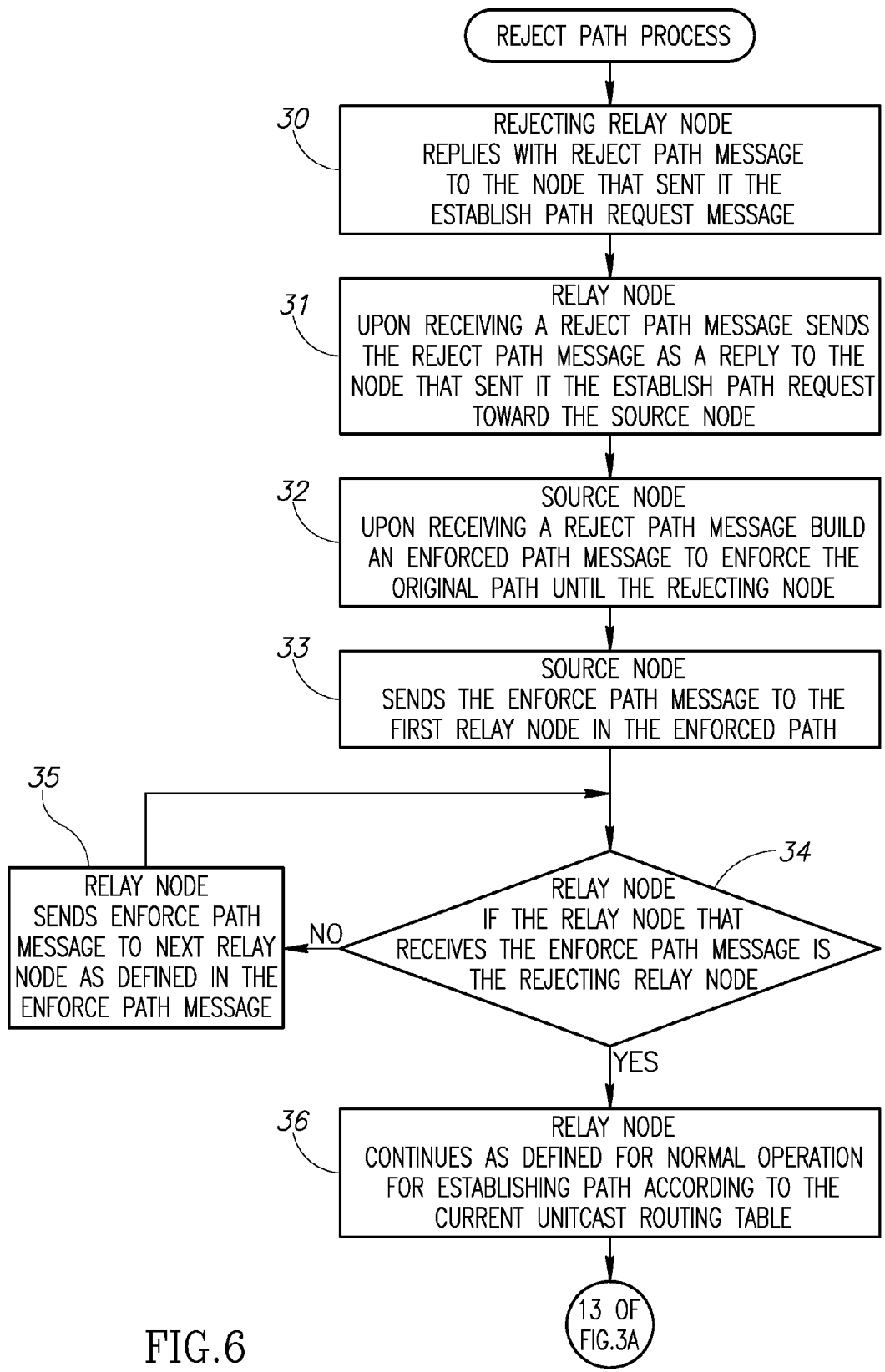
FIG. 6 is a block diagram of a novel method for rejecting and enforcement of a path establishment for a multicast stream, constructed and operative in accordance with the present invention. It will be appreciated that for simplicity and clarity of illustration, elements shown in the figures have not necessarily been drawn to scale. For example, the number of entities depicted and/or the dimensions of some of the elements may be exaggerated relative to other elements for clarity. Further, where considered appropriate, reference numerals may be repeated among the figures to indicate corresponding or analogous elements.

Reference is now made to FIG. 6. which illustrates the path rejection and enforcement process. If a relay node receives a path request message from a node other than the valid node of a certain multicast stream it may then reply to source node 1 with a reject path message. The reject path message may contain the DEVICE_ID of the rejecting relay node, node 4, together with DEVICE_ID of the node from which it received the path request message and the reason for the rejection. The rejecting node sends (step 30) the reject path message to the relay node from which it got the path establishment request message. Each relay node that receives a reject path message sends (step 31) it to the node from which it received the path establishment message.

When source node 1 receives the reject path message from node 2, node 1 may decide to release the entire tree or the branch of the path and may rebuild it again. Alternatively, source node 1 may enforce (step 32) the establishment of the original path up until node 4, based on the existing path used for client node 8. This enforcement will cause node 2 to use node 3 as next relay in the path instead of using node 5, although node 5 is marked in node 2 unicast routing tables as the next relay node toward node 6.

If source node 1 decides to enforce the existing path, it may send an enforce path message towards node 4 via the original path. Node 1 may send (step 33) the enforce path message to the first relay node (node 2) in the original path towards the rejecting node (node 4 in this example). The enforce path message may contain the full path until node 4 from the source node (node 1). It will be appreciated that each relay node that receives the enforce path message may forward (step 35) the message to the next relay node according to the path specified in the enforce path message toward the rejecting node. When node 4, the rejecting node, receives the enforce path message it may create a path request and forward (step 36) the message to the next relay node according to the current routing table towards client node 6. From this phase, the path establishment procedure towards client node 6 may continue as specified hereinabove. Client node 6 may reply with a confirmation message to node 4 that sent it the path request message. All the relay nodes on the path back towards the source node 1, upon receiving the confirmation message, may execute the bind, update the confirmation message with their own DEVICE_ID and forward the confirmation message towards source node 1.

When a source node decides to release a client node from its MSID, it may send a release path message to the respective client node or to its first relay node in case the client node is accessed via a relay node. For example, referring back to FIG. 2, source node 1 may wish to release client node 6, therefore node 2 may receive the release path message, may release node 6 from its bind list and forward the message towards node 6. It will be appreciated that each node that receives the message may reply with a release path confirmation message to the node that sent it the release path message. A node that does not have another node in its bind list may then release itself from the MSID multicast stream of that source node and indicate this in the replied release path confirmation message.

It will be appreciated that unicast routing tables may frequently be updated, for example in response to changes in the quality of connections between nodes. However, in accordance with a preferred embodiment of the present invention, the multicast paths are kept constant unless a link in the path becomes broken.

Figure 1:
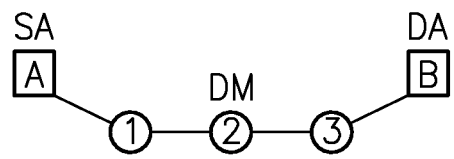
FIG. 1 is a schematic illustration of exemplary network of three nodes 1, 2 and 3, connected in series on a wired network.

When one of the relay nodes determines that the path of a specific MSID of a certain source node is broken, it may inform the domain master (such as node 2 in FIG. 1) about the break, using a standard "topology update" message, and may also inform the source node of the pertinent multicast stream. The multicast source node may then request an updated routing table from the domain master and may use it to correct the broken path. The source node may correct an existing path by first sending a release path message to the relevant nodes in the broken path and then it may send a new path request to those nodes, to generate the new path.

In order to prevent a situation where a multicast source node leaves the network and all the respective nodes in the multicast stream path still hold resources for that multicast stream, an aging mechanism may be used. The source node of each multicast stream (MSID) may periodically send a path alive message via the established MSID multicast stream paths tree. Each node in the tree may then reset its aging timer and may relay the path alive message according to the routing multicast binding information for the MSID. Each one of the nodes in the path that do not receive any path alive message within a predetermined period (typically of 1 second) may release all of its MSID resources of that source node.

Unless specifically stated otherwise, as apparent from the preceding discussions, it is appreciated that, throughout the specification, discussions utilizing terms such as "processing," "computing," "calculating," "determining," or the like, refer to the action and/or processes of a computer, computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. Such a computer program may be stored in a computer readable storage medium, such as, but not limited to, any type of disk, including floppy disks, optical disks, magnetic-optical disks, read-only memories (ROMs), compact disc read-only memories (CD-ROMs), random access memories (RAMs), electrically programmable read-only memories (EPROMs), electrically erasable and programmable read only memories (EEPROMs), magnetic or optical cards, Flash memory, or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A network node comprising:
   at least one unicast routing table to at least store information about which node may be used as a relay node towards at least one other node in a network;
   a multicast path generator to receive an establish path request message, originated by a source node, to be created towards a client node, and to select a next node in a multicast path towards said client node by checking said unicast routing tables and to transmit said establish path request message to said next node; and
   a multicast path updater to update said next node in said multicast path upon an explicit order from said source node and not to update said next node in said multicast path in response to a change in any of said unicast routing tables.

2. The network node according to claim 1 wherein said multicast path generator also comprises a multicast table to store a multicast stream identifier from a source node and to store said next node in said multicast path.

3. The network node according to claim 2 and also comprising a multicast transmission unit to transmit multicast transmissions from said source node to said client node according to said multicast table.

4. The network node according to claim 2 wherein said multicast path is used unless a link to said next node in said multicast path becomes broken.

5. A method for multicast transmissions between a source node and a client node, the method comprising:
   said source node generating a multicast stream identifier to uniquely identify a multicast stream;
   said source node establishing a multicast path between said source node and said client node for said multicast stream, each node in said multicast path using unicast routing tables in order to identify a next node on said multicast path during path establishment;
   said source node transmitting messages of said multicast stream along said multicast path; and
   each said node in said multicast path updating said next node in said multicast path upon an explicit order from said source node and not updating said next node in said multicast path in response to a change in any of said unicast routing tables.

6. The method according to claim 5 and wherein said establishing comprises:
   said source node using its said unicast routing tables to transmit an establish path request message towards a relay node in the direction of said client node for said multicast stream; and
   said source node receiving a confirmation message from said client node after said client node received said establish path request message passed by relay nodes between said source node and said client node.

7. The method according to claim 6 and wherein said establishing is in response to receiving a join request from said client node.

8. The method according to claim 6 and wherein said establishing is subsequent to an internal decision made by said source node to send said multicast transmission to said client node.

9. The method according to claim 6 and also comprising each said relay node rejecting a new establish path request message sent not from its previous node in said multicast path associated with said multicast stream.

10. The method according to claim 9 wherein nodes are forced to use a different next node according to instructions from said source node that differ from said next node in their unicast routing tables.

11. The method according to claim 6 wherein each one of said relay nodes in said multicast path adds its device identifier to said confirmation message and wherein said source node stores the nodes comprising said multicast path towards a client node based on said confirmation message.

12. The method according to claim 5 and also comprising said source node rebuilding said multicast path when a connection between two said nodes in said multicast path breaks.

13. The method according to claim 5 and also comprising said source node releasing said nodes from said multicast path when a connection between two said nodes in said multicast path breaks.

14. The method according to claim 5 and also comprising said source node releasing said client node by also releasing said each node on said multicast path.

15. The method according to claim 14 wherein said each node on said multicast path sends a release path request message to the next node on said multicast path and wherein each node sends back a release path confirmation message.

16. The method according to claim 14 wherein said each node that is released from the multicast path releases all resources associated with said multicast stream if it is no longer a relay node in any of the multicast paths of that multicast stream.

17. The method according to claim 5 and also comprising an aging mechanism to determine that said source node has left the network.

18. The method according to claim 17 wherein said source node sends periodic path alive messages to said each node bound to said multicast stream and wherein each node bound with said multicast stream resets its aging timer upon reception of said path alive message.

19. The method according to claim 18 wherein said each node releases all resources associated with said multicast stream and unbinds itself from the multicast stream if said aging timer has expired.

* * * * *